F. SCHIMMEL.
SHOCK ABSORBER CONNECTION.
APPLICATION FILED AUG. 20, 1915.
1,227,963.
Patented May 29, 1917.
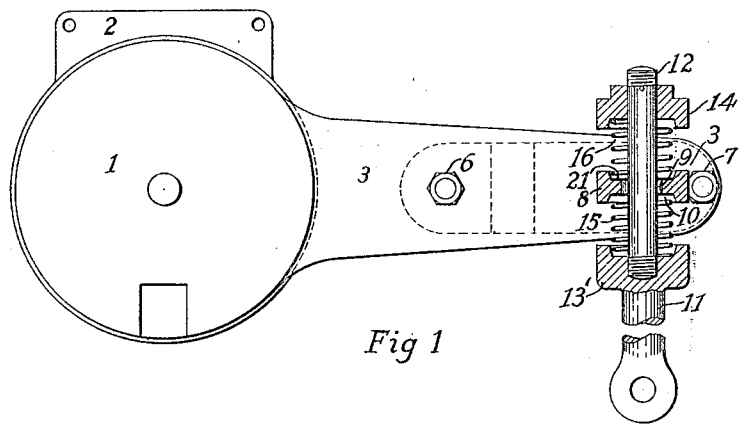
Fig 1
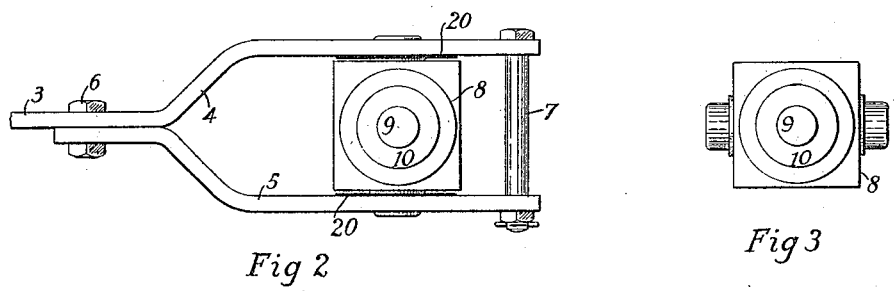
Fig 2
Fig 3
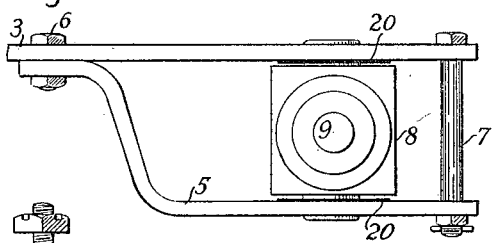
Fig 4
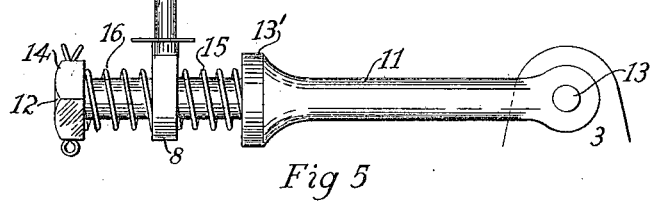
Fig 5
Witnesses:
Fridolin Schimmel
Inventor
By his Attorney

UNITED STATES PATENT OFFICE.

FRIDOLIN SCHIMMEL, OF FARIBAULT, MINNESOTA.

SHOCK-ABSORBER CONNECTION.

1,227,963.   Specification of Letters Patent.   Patented May 29, 1917.

Application filed August 20, 1915. Serial No. 46,494.

*To all whom it may concern:*

Be it known that I, FRIDOLIN SCHIMMEL, of Faribault, Rice county, in the State of Minnesota, have invented certain new and useful Improvements in Shock-Absorber Connections, of which the following is a specification, reference being made to the accompanying drawing, forming a part hereof.

The improvements are related to shock absorbers of the toggle or scissor type and are concerned more particularly with the attaching and means of connection of the shock absorber to the car; and has for its object the production of a link connection which will provide a neutral or free action in the assembly through the shock absorber before the shock absorber is brought into play.

A further object of the invention is to provide a means for supporting the shock absorber to the car body and connecting its free arm to the axle in a flexible though positive manner, providing sufficient side play to take care of any wrenching or twisting as the car swings around corners.

In all scissor or toggle types of shock absorbers which are attached to the car at the end of two arms, most of the weight of the shock absorber is carried on the axle of the car. The over-hanging weight of the shock absorber itself throws it out of balance and acts as a trip hammer pounding upon the axle and bearings at the end of the arms. When the shock absorber is hung to the car body, as hereinafter proposed, and the improved link connection is made to the axle, through a yielding connection at the shock absorber arm, this jarring and hammering is entirely eliminated, and no weight is thrown upon the axle, as will be readily understood.

Having thus set forth the objects of my invention, I will now describe an embodiment thereof.

Figure I illustrates the shock absorber and the assembly complete.

Fig. II is the top view of the arm, showing the swivel connection without the link.

Fig. III illustrates the swivel block.

Fig. IV is a modification of Fig. II.

Fig. V illustrates a modification of my invention, showing the universal free connection at the opposite end of the link 11.

In the carrying out of my invention I employ a shock absorber 1 of standard type, provided with a bracket extension 2, extending from the main drum, to provide means for attaching the device directly to the frame of the car. The arm 3 of the shock absorber is either bifurcated at 4, or an additional plate 5 is provided which may be bolted to the arm 3 by the bolts 6 and 7. In this bifurcated end is pivotedly supported a swivel block 8, provided with a through hole 9 and recesses 10. The recesses 10 are provided to support the compression springs 15 and 16. Passing through the hole 9 I provide a link 11, threaded at one end 12, having an eye 13 at the opposite end. Midway between the ends I provide a shoulder 13' having a recess on the side next to the end 12. On screw threaded end 12 I provide a nut 14 which has a similar recess on inner face. These recesses form retainers for the springs 15 and 16, as will be readily understood, when coacting with the recesses 10 of the swivel block 8. These recesses prevent the springs from contacting with the body of the link 11. The hole 9 being considerably larger than the link 11 the link is free to move in any direction without contacting with the sides of the hole.

In assembling the shock absorber the threaded end of the link 11 is passed through spring 15 and then through the hole 9 of the swivel block 8. Spring 16 is then put over the end 12 and the collar 14 screwed into place. These collars are prevented from turning by pinning to the link or by any other well known means. The springs are adapted to fit the recesses in the swivel block as well as the recesses in the collars and are sufficiently large in diameter so as not to contact with the link 11.

Felt washers are provided in the recesses 10 of the swivel block 8 which will hold the link 11 from contacting with the side of the hole 9.

The eye 13 is provided solely as a means to attach the link to the car axle.

With this construction it will be readily understood that the link 11 is free to move with the vibration of the car axle, and permits free action of the car springs up to a predetermined limit before the link, through the yieldingly attached swivel connection to the shock absorber arm, brings into action the main drum of the shock absorber to resist excessive car spring action and control the rebound of the car body.

The drawing shows fiber rings 20, which are provided to properly separate the parts and prevent wear during operation; also felt washers 21 to keep the link from contacting with the swivel block and permitting a rattle. Such details of construction, however, are not essential to the present improvements which may obviously be otherwise embodied than as shown in the drawings.

Having thus fully described my invention, what I claim as new, and desire to secure by Letters Patent, is:

1. A shock absorber having a bifurcated arm, carrying a pivotedly mounted block, in combination, with a link yieldingly connected to the beforementioned block, the said link being free to move in any direction without contacting with the block.

2. A link connection for a shock absorber, in combination, a swivel block provided with a hole, a link passing through the hole of said block and yieldingly connected thereto, the diameter of the opening in the swivel block being enough larger than the diameter of the link to permit free movement in all directions.

3. A link connection for a shock absorber, in combination, a swivel block provided with a recessed hole, a link passing through the said hole, and provided with recessed shoulders, compression springs between the recesses in the swivel block and the recesses in the shoulders, the said link being free to move in any direction without contacting with the hole.

4. A link connection for a shock absorber, in combination, a swivel block provided with a through hole of comparatively large diameter and spring retainers, a link of comparatively small diameter passing through the hole and provided with spring retainers, coil springs interposed between the aforesaid retainers whereby the swivel and link are connected through a yielding pressure, permitting free resilient movement in all directions.

In testimony whereof, I have signed my name to this specification in the presence of two subscribing witnesses.

FRIDOLIN SCHIMMEL.

Witnesses:
J. W. LE GORE,
RICHARD B. KENT.

Copies of this patent may be obtained for five cents each, by addressing the "Commissioner of Patents, Washington, D. C."